(12) United States Patent
Stoeferle

(10) Patent No.: US 9,720,178 B2
(45) Date of Patent: Aug. 1, 2017

(54) ELECTROMAGNETIC WAVE RESONATOR WITH EFFECTIVE REFRACTIVE INDEX GRADIENT

(75) Inventor: Thilo Stoeferle, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 14/005,420

(22) PCT Filed: Feb. 23, 2012

(86) PCT No.: PCT/IB2012/050820
§ 371 (c)(1),
(2), (4) Date: Sep. 16, 2013

(87) PCT Pub. No.: WO2012/123835
PCT Pub. Date: Sep. 20, 2012

(65) Prior Publication Data
US 2014/0002894 A1 Jan. 2, 2014

(30) Foreign Application Priority Data
Mar. 16, 2011 (EP) .................................. 11158530

(51) Int. Cl.
*G02B 6/26* (2006.01)
*G02B 6/42* (2006.01)
(Continued)

(52) U.S. Cl.
CPC ..... *G02B 6/29338* (2013.01); *G02B 6/29341* (2013.01); *G02B 6/12007* (2013.01); *H01P 7/10* (2013.01)

(58) Field of Classification Search
CPC ........................ G02B 6/29341; G02B 6/29338
(Continued)

(56) References Cited

U.S. PATENT DOCUMENTS 4,758,066 A * 7/1988 Someda ........................... 385/11
5,274,720 A * 12/1993 Yamamoto ..................... 385/129
(Continued)

OTHER PUBLICATIONS

"Athermal silicon-on-insulator ring resonators by overlaying a polymer cladding on narrowed waveguides," by Teng et al, Optics Express, vol. 17, No. 17, pp. 14627-14633, 2009.*
(Continued)

*Primary Examiner* — Robert Tavlykaev
(74) *Attorney, Agent, or Firm* — Scully, Scott, Murphy & Presser, P.C.; David M. Quinn, Esq

(57) ABSTRACT

An electromagnetic wave resonator comprising a body, wherein the body: has a structure extending essentially in a plane (r, θ), comprises a material in a region between limit radii $r_i$ and $r_o$, where $0 \leq r_i < r_o$ and $r_o$ corresponds to a radius of a convex hull ($\mathcal{C}_o$) of the structure; and allows for electromagnetic wave propagation, and wherein an effective refractive index $n_e(r)$, as obtained from angularly averaging a refractive index of the material in the plane (r, θ), decreases within said region.

13 Claims, 5 Drawing Sheets

(51) Int. Cl.
*G02B 6/12* (2006.01)
*G02B 6/293* (2006.01)
*H01P 7/10* (2006.01)

(58) Field of Classification Search
USPC .................................. 385/1–3, 14, 32, 58
See application file for complete search history.

(56) References Cited

U.S. PATENT DOCUMENTS

| | | | |
|---|---|---|---|
| 6,901,189 B1* | 5/2005 | Savchenkov et al. | 385/39 |
| 7,062,131 B2* | 6/2006 | Ilchenko | 385/50 |
| 7,440,651 B1 | 10/2008 | Savchenkov et al. | |
| 7,941,015 B2* | 5/2011 | Bratkovski et al. | 385/32 |
| 2002/0041730 A1 | 4/2002 | Sercel et al. | |
| 2003/0174984 A1* | 9/2003 | Chiang et al. | 385/124 |
| 2003/0201249 A1* | 10/2003 | Harker | B44B 5/0052 216/54 |
| 2006/0072875 A1* | 4/2006 | Bhagavatula et al. | 385/30 |
| 2008/0193079 A1 | 8/2008 | Cheben et al. | |
| 2008/0284668 A1 | 11/2008 | Justice et al. | |
| 2009/0080075 A1* | 3/2009 | Ho | G02B 1/118 359/569 |
| 2010/0290118 A1* | 11/2010 | Yamada | A01K 63/003 359/513 |

OTHER PUBLICATIONS

"Greatly reduced losses form small-radius bends in Ti:LiNbO3 waveguides", by Korotky et al, Integrated Optics, Nolting (Ed), Springer-Verlag, Berlin, pp. 207-209, 1985.*

"Implementation of a graded-index medium by use of subwavelength structures with graded fill factor" by Levy et al, Journal of Optical Society of America A, vol. 22, No. 4, pp. 724-733, Apr. 2005.*

"Antireflection structured surfaces for the infrared spectral region" by Raguin et al, Applied Optics, vol. 32, No. 7, pp. 1154-1167, Mar. 1993.*

"Design and fabrication of a nanostructured surface combining antireflective and enhanced-hydrophobic effects" by Chang et al, Nanotechnology, vol. 18, pp. 285303-1-285303-6, 2007.*

"Radially graded index whispering gallery mode resonator for penetration enhancement" by Zhu et al, Optics Express, vol. 20, No. 24, pp. 26285-26291, 2012.*

Yu et al., "Complete optical isolation created by indirect interband photonic transitions", Nature Photonics, vol. 3, Feb. 2009, www.nature.com/naturephotonics, 2009 Macmillian Publishers Limited, Corrected Online: Apr. 15, 2009, Published Online: Jan. 11, 2009, DOI: 10.10.1038/NPHOTON.2008.273, pp. 91-95.

Schmid et al., "Gradient-index antireflective subwavelength structures for planar waveguide facets", Optics Letters, vol. 32, No. 13, Jul. 1, 2007, pp. 1794-1796.

Cheben et al., "Refractive index engineering with subwavelength gratings for efficient microphotonic couplers and planar waveguide multiplexers", Optics Letters, vol. 35, No. 15, Aug. 1, 2010, pp. 2526-2528.

Cheben et al., "Subwavelength waveguide grating for mode conversion and light coupling in integrated optics", Optics Extress, May 29, 2006, vol. 14, No. 11, pp. 4695-4702.

Bock et al., "Subwavelength grating periodic structures in silicon-on-insulator: a new type of microphotonic waveguide", Optics Express, Sep. 13, 2010, vol. 18, No. 19, pp. 20251-20262.

International Search Report PCT/IB2012/050820.

* cited by examiner

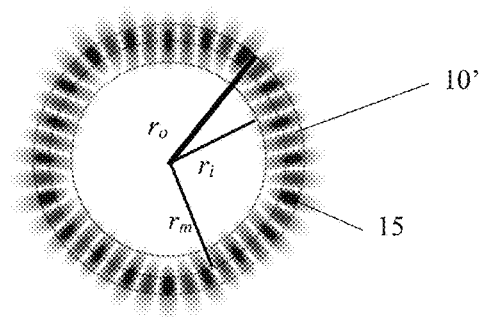
FIG. 1. (PRIOR ART)
FIG. 2.A (PRIOR ART)
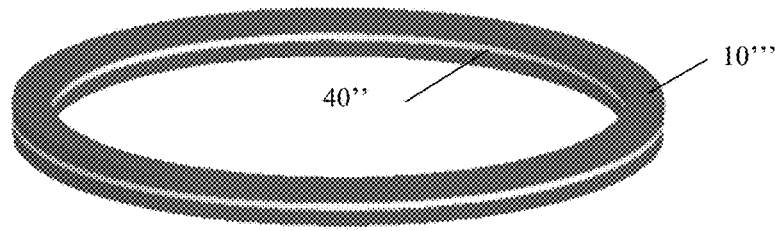
FIG. 2.B (PRIOR ART)

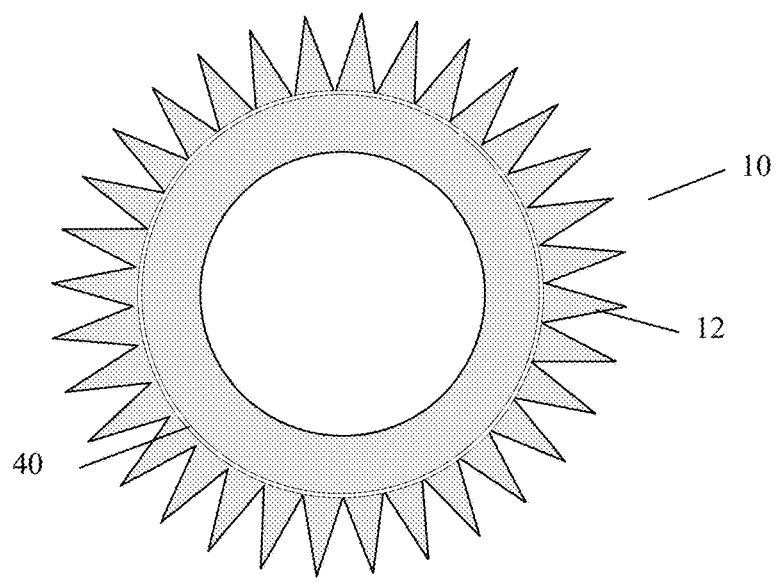
FIG. 7.
FIG. 8.A
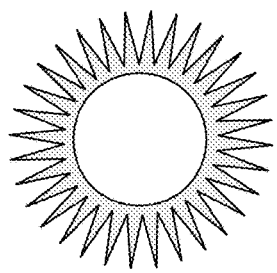
FIG. 8.C
FIG. 8.B
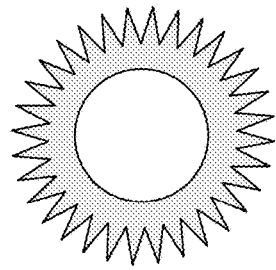
FIG. 8.D
FIG. 8.E
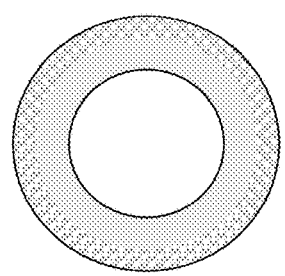
FIG. 8.F

ELECTROMAGNETIC WAVE RESONATOR WITH EFFECTIVE REFRACTIVE INDEX GRADIENT

FIELD OF THE INVENTION

The invention relates to the field of electromagnetic wave resonators, in particular resonators for optical communications.

BACKGROUND OF THE INVENTION

Resonators are basic building blocks for a number of present and future integrated photonic components, such as switches, Lasers, filters and sensors. For instance, FIG. 1 shows results obtained by simulating wave propagation in a typical prior art ring resonator, characterized by an inside (internal) radius $r_i$, outside (external) radius $r_o$ and mean radius $r_m$.

A first issue with such a resonator arises from small evanescent fields they produce, which do not allow for satisfactory electromagnetic coupling to surrounding material. A high refractive index material for the ring is necessary for tight bends and therefore dense integration. Then, however, light is strongly confined in the ring. Only a small fraction thereof is evanescent and allows for coupling to material in the cladding/surrounding (e.g. electro-optic polymers, gain material or to-be-detected material/particles with sensor applications). Furthermore, the peak intensity is confined in the high index material and is not available for coupling to surrounding material. This also makes optical trapping of nanoparticles, biological entities (e.g., cells) very difficult (high power, low efficiency). In FIG. 1, a typical in-plane electric field $|E_{xy}|$ is superimposed to the ring resonator's structure. The gray level used makes that opposite sign values of the field are indistinctly rendered; this will be further discussed later.

State-of-the-art solutions are the following:
  For ring resonators with very high Q-factor (i.e., very low losses), no practical solution is known, to the best knowledge of the present inventor;
  For ring resonators with moderate Q-factor (typically Q<10000), slotted rings can be used. Yet, slotted rings are technologically challenging (i.e., complicated and expensive manufacturing) and not suitable for many materials, combinations thereof, nanoparticles or combinations with microfluidic sensor systems (narrow slots<100 nm are difficult to fabricate and to fill). FIGS. 2A-B show examples of slotted ring resonators (FIG. 2A: resonator with vertical slot, perpendicular to the mean plane of the structure, FIG. 2B: resonator with horizontal slot. In both cases, the active material is at the center of the ring material).

Another issue is that the coupling strength critically depends on (e.g., nanometer-scale) distance between the ring and a neighboring waveguide. Namely, it is difficult to reliably achieve critical coupling due to fabrication variations, i.e., width variations of waveguides and/or gap.

The following documents provide details as to the background art in the field:
"Subwavelength grating periodic structures in silicon-on-insulator: a new type of microphotonic waveguide", Bock et al., Optics Express 18, 20251 (2010);
"Interface Device For Performing Mode Transformation in Optical Waveguides", Cheben et al., US 2008/0193079 A1;
"Subwavelength waveguide grating for mode conversion and light coupling in integrated Optics", Cheben et al., Optics Express 14, 4695 (2006);
"Refractive index engineering with subwavelength gratings for efficient microphotonic couplers and planar waveguide multiplexers" Cheben et al., Optics Letters 35, 2526 (2010);
"Gradient-index antireflective subwavelength structures for planar waveguide facets", Schmid et al., Optics Letters 32, 1794 (2007); and
Z. Yu and S. Fan, "Complete optical isolation created by indirect interband photonic transitions". Nature photonics 3, 91-94, (2009).

BRIEF SUMMARY OF THE INVENTION

In one aspect, the present invention is embodied as an electromagnetic wave resonator, comprising a body, wherein the body:
  has a structure extending essentially in a plane,
  comprises a material in a region between limit radii $r_i$ and $r_o$, where $0 \leq r_i < r_o$ and $r_o$ corresponds to a radius of a convex hull of the structure; and
  allows for electromagnetic wave propagation,
  and wherein an effective refractive index $n_e(r)$, as obtained from angularly averaging a refractive index of the material in the plane, decreases within said region.

In embodiments, the resonator may comprise one or more of the following features:
  an effective density of the material, as obtained from angularly averaging a density of the material in the plane, decreases in said region;
  an effective fill factor of the material, as obtained from angularly averaging a fill factor of the material in the plane, decreases in said region;
  the body is structured with peripheral features configured such as to obtain said decreasing effective refractive index $n_e(r)$;
  said features extend radially and outwardly, essentially perpendicular to a closed-curve characteristic of the structure, and wherein the features are preferably configured as teeth or wedges;
  the resonator is designed for a given range of electromagnetic waves, preferably 630 nm to 860 nm or 1300 nm to 1600 nm; and a characteristic pitch, preferably a chordal pitch, between said features is substantially less than a typical wavelength $\lambda_m$ of said given range, preferably less than $\lambda_m/2$ and more preferably less than $\lambda_m/4$.
  said characteristic pitch is between 30 nm to 500 nm, preferably between 30 nm to 200 nm;
  a characteristic depth of said features is less than $10\lambda_m$;
  the radius $r_o$ of the convex hull is substantially larger than $\lambda_m$, preferably larger than $3\lambda_m/2$ and more preferably larger than $2\lambda_m$;
  the body has a slot, preferably perpendicular to said plane;
  the resonator has a disk shape or a closed loop structure such as a ring shape, and wherein preferably the body is single-piece;
  the body comprises a material with a refractive index higher than a surrounding media's, wherein the material comprises elements or compounds chosen amongst: semiconductors such as Si, GaAs, GaN, InP or InGaN; oxides such as $SiO_2$, $TiO_2$, $Ta_2O_5$, $HfO_2$, $Al_2O_3$, or $LiNbO_3$; or nitrides such as $Si_3N_4$, SiON or TiON;

the resonator further comprises an additional material surrounding said material such as to form said surrounding media and preferably comprising compounds chosen amongst: oxides such as $SiO_2$, $TiO_2$, $Ta_2O_5$, $HfO_2$, $Al_2O_3$, or $LiNbO_3$; nitrides such as $Si_3N_4$, SiON or TiON; polymers; oils; or water; and the resonator further comprises an additional material surrounding said material such as to form said surrounding media, wherein a thermo-optic coefficient of said additional material and a thermo-optic coefficient of said material have opposite signs.

In another aspect, the present invention is embodied as an integrated optics device comprising one or more resonators, each according to the invention.

Resonators embodying the present invention will now be described, by way of non-limiting examples, and in reference to the accompanying drawings.

BRIEF DESCRIPTION OF SEVERAL VIEWS OF THE DRAWINGS

FIG. 1 shows results obtained by simulating wave propagation in a typical ring resonator (prior art);

FIGS. 2.A-B illustrate typical slotted ring resonators (prior art);

FIGS. 3-8F depict resonators according to embodiments of the present invention;

DETAILED DESCRIPTION OF THE INVENTION

Figure 3:
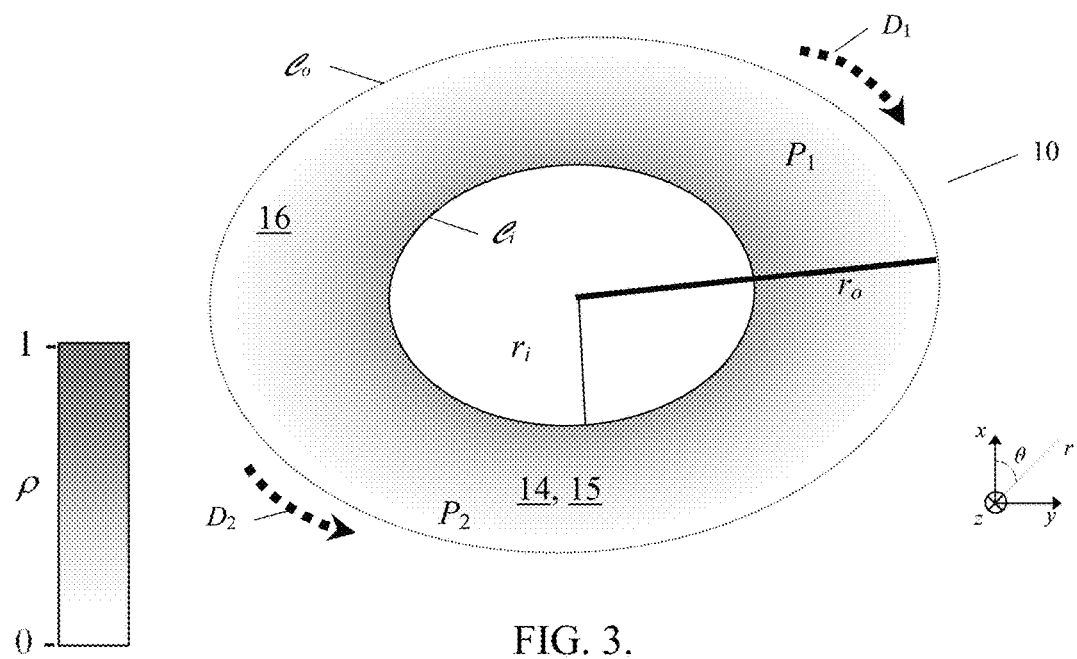
Figure 4:
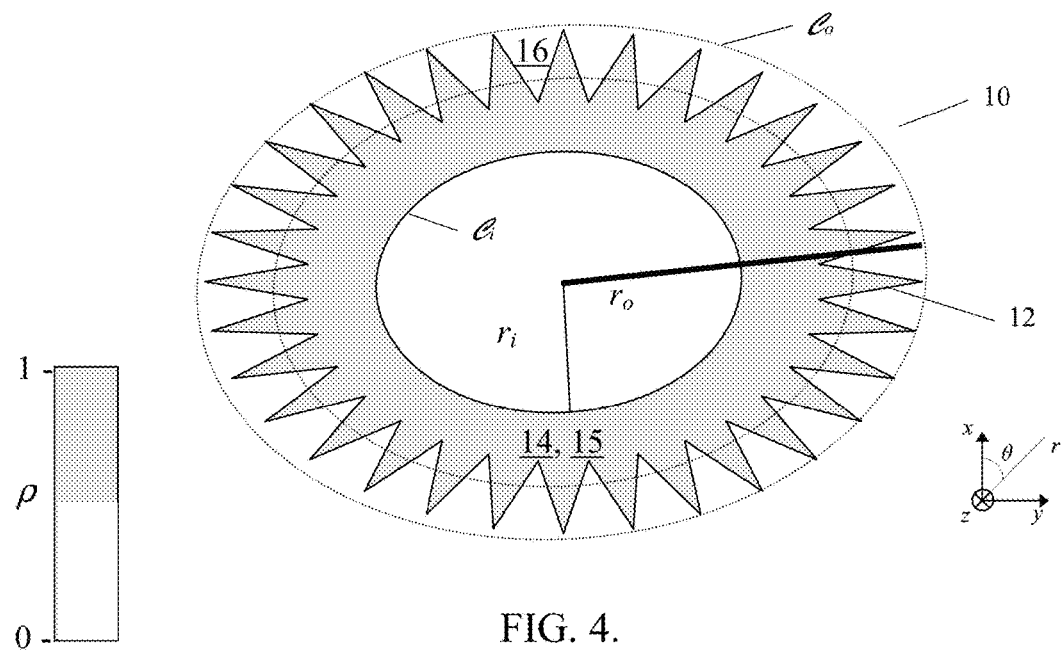
Figure 5:
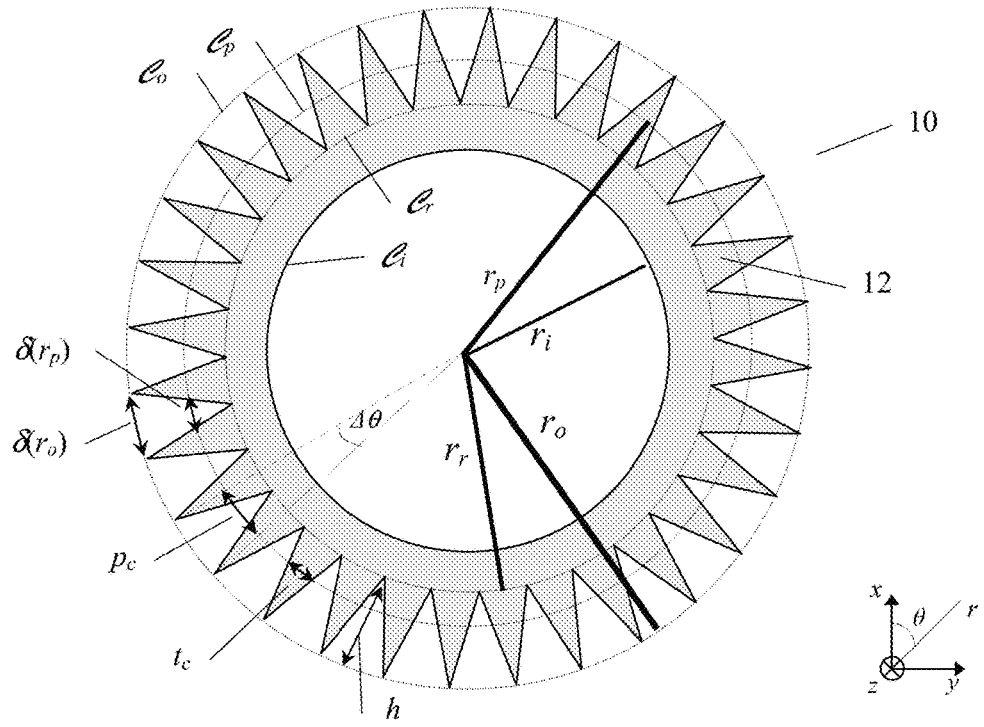
Figure 6:
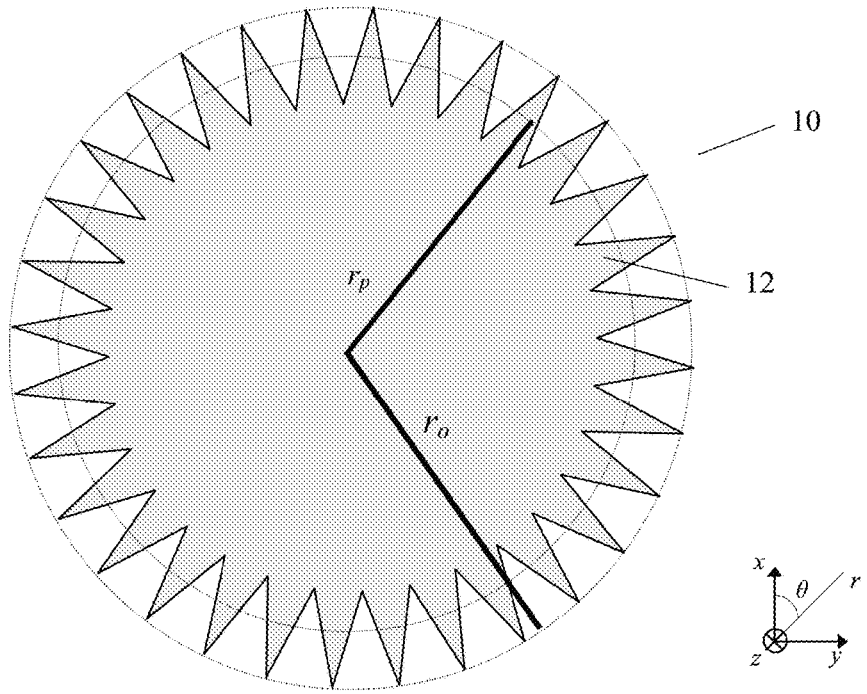

As an introduction to the following description, it is first pointed at general aspects of the invention, reflecting in each of the embodiments of FIGS. 3-9. In each case, electromagnetic wave resonators 10 are depicted, each comprising a body 15, whose structure essentially extends in the plane (x, y), or equivalently (r, θ), in polar coordinates. The body typically has a convex shape, such as a ring, elliptical or disk shape, and allows for wave propagation, as usual. Typically, it can be regarded as defining two opposite directions $D_1$, $D_2$ of wave propagation. Technically, and as described later in reference to FIGS. 3-9, the body fills a region of space defined by two limit radii $r_i$ and $r_o$, wherein some material (suited for wave propagation) is provided. The limit radii $r_i$ and $r_o$ obey $0 \leq r_i < r_o$. The limit radii $r_i$ and $r_o$ can for instance be taken as follows: the first radius $r_i$ is a largest internal radius (possibly zero if the core of the structure is filled, like in a disk). The second radius, $r_o$, corresponds to the largest outside radius, i.e., the largest radius of a convex hull (or envelope) $\mathcal{E}_o$ of the structure, i.e., the minimal convex set containing the structure in the plane (r, θ).

Now, interestingly and independently of its exact geometrical structure, a resonator according to embodiments is configured to exhibit an effective refractive index gradient. More precisely, the effective refractive index $n_e$ 16 of the resonator decreases radially and outwardly in the plane (r, θ), see e.g., FIGS. 3-6. "Effective" index means the average refractive index n as obtained in a radial representation, i.e., angularly averaged over θ in the plane. In said radial representation, the effective index becomes a function of r only, i.e., $n_e \equiv n_e(r)$, with $0 \leq r \leq r_o$, where r=0 corresponds to the center-of-mass of the body and r≠0 represents an average radial distance from the center-of-mass.

As illustrated in FIG. 11, a typical $n_e(r)$ that results from a structure such as that of FIGS. 5-9 is not uniform along the segment $[r_i, r_o]$, at variance with a usual resonator. Instead, $n_e(r)$ takes values lower than $n_0$, i.e., the nominal index value near $r_i$, i.e., corresponding to the bulk material. The trend of $n_e(r)$ gives rise to what is, here, called an effective refractive index gradient (a gradient of the effective refractive index). The decrease of $n_e(r)$ can for instance be stepwise (dashed curve in FIG. 11) or continuous, with some degree of curvature (plain line curve) or linear (dotted-dashed curve), etc. It may further decrease to zero, or not. More generally, for non-circular (e.g., ellipsoid) structures such as that of FIG. 3 or 4, $n_e$ may not be strictly monotonic between the smallest inside radius (call it $r_{i'}$) and the largest outside radius $r_o$. It shall nonetheless mostly decreases in the region of interest, i.e., $r_i < r < r_o$, especially near $r_o$, when $r_i$ is taken as the largest inside radius ($r_1 < r_i < r_o$). In other words, $n_e$ decreases near the periphery, on average. In the following, any property that generally decreases in the region $r_i < r < r_o$ of interest shall be said to decrease radially and outwardly in the plane (r, θ). A simple example is the ring resonator of FIG. 5 ($r_{i'} = r_i$), where the effective index takes lower values near the periphery, thanks to the angular average.

As it was realized by the present inventor, an effective refractive index such as described above allows for partly delocalizing waves outside the resonator body, whereby improved coupling to material in the cladding/surrounding can be achieved, with many potential applications such as described in introduction.

Many suitable structures/compositions can be contemplated which fulfill the above requirement, as to be discussed next.

For example, the effective refractive index 16 may be taken such as to decrease outwardly, along any local curvature radius of the convex hull (or envelope) of the structure. This is for instance the case in the embodiment of FIG. 3. The radius of curvature at a given point of the convex hull can be regarded as the radius of a circle that best fits the envelope at that point. For the sake of representation, the body structure can be regarded as comprising many curved portions $P_1, P_2, \ldots$, each defining respective curvature radii. In FIG. 3, the refractive index n decreases outwardly along each of the directions spanned by said respective curvature radii, i.e., it decreases along any local curvature radius. Accordingly, the radial projection $n_e$ of the refractive index also decreases radially and outwardly.

In the example of FIG. 3, the body 15 actually comprises an (active) material 14 suitable for wave propagation, whose density ρ decreases outwardly, and this, along any local curvature radius. As a result, the angularly average (or effective) density $ρ_e \equiv ρ_e(r)$ also decreases along the radial axis. A density plot is accordingly depicted (free scale, ρ renormalized between 0 and 1), corresponding to a non-uniform distribution of active species and in turn, an effective refractive index gradient. Regions comprising more active species (high index) per volume unit are darker.

Appropriate density gradients might for instance be obtained by modifying the distribution of active species of the material within the body. In this regards, one may use any process suitable for modifying the distribution of such species. As a result, the density of active species (i.e., the number of particles per volume unit) is non-uniform in the plane (x, y); it decreases outwardly, such as to draw the desired properties.

Now, modifying the active species distribution can be done at various scales. This can for instance be fine-grained: by way of additional (non-active) dopants, implanted at the periphery of the body; by multistep lithography; or the like; by nanopatterning; by bottom-up techniques such as self-assembly. Such techniques are known per se. As a result, the density decreases outwardly, along any local curvature radius.

However, in preferred variants, perhaps easier to implement in practice, the active species distribution is macroscopically modified, whereby the fill factor of material 15 is modified. Namely, suitably configured regions of space are to be filled with an active material at the manufacture stage, such that angularly averaged density has the desired property. Examples shall be discussed. In all cases, a density gradient leads in fine to an effective refractive index gradient, the desired property.

For example, the material 14 in the body 15 can be structured with peripheral features 12 suitably configured, in order to obtain the desired index gradient. For example, peripheral features may extend outwardly, such as to decrease the fill factor near the envelope $\mathcal{C}_o$, that is, near the periphery of the body 15.

This situation is exemplified in FIGS. 4-9. In each case, the structure of the body with features is bounded by an outside envelope, i.e., the convex hull $\mathcal{C}_o$. When the latter has a non-constant radius; $r_o$ is taken to be the largest. Conversely, when the body has a closed-loop structure, i.e., not filled at the center (see e.g., FIG. 4, 5 or 7), the hollow core draws a characteristic inner closed-curve $\mathcal{C}_i$. Similarly, when the latter has a non-constant radius, $r_i$ is taken as the largest inside radius. The radial projection of any property of the body is defined between $r_i$ (the smallest inside radius) and $r_o$ (the largest outside radius). Yet, the decrease of the relevant properties shall be observed in the region $r_i < r < r_o$. Of course, if the structure is a ring or a disk, as in FIGS. 5-9, the centers of curvature are degenerate and the curvature radius is constant.

In the embodiments of FIGS. 4-9, the partial filling of active material near the periphery causes the effective (radial) density that results on average in the plane to decrease radially and outwardly. This, in turn, leads to an effective index gradient decreasing radially and outwardly too.

As it can be realized, a partial fill factor near the periphery may be obtained in various manners, e.g., by way of peripheral cavities (FIG. 8.E), concentric features such as slots perpendicular to the mean plane (FIG. 8.F), etc., or still, by way of radial features, i.e., extending radially and outwardly. This last option is preferred, as illustrated in FIGS. 4-7, 8.A-8.D and 9. As seen, the body is structured with radial features 12 protruding outwardly, such as to yield a decreasing effective index $n_e(r)$. Suitable peripheral features 12 are for instance obtained in the form of teeth, or wedges 12, as shown.

Despite the many resulting interfaces, low loss is possible if said features extend essentially perpendicular to the main directions of wave propagation (i.e., perpendicular to any closed-curve $\mathcal{C}_o$ or $\mathcal{C}_i$ that characterizes the structure), as depicted in FIGS. 4-9.

In addition, the pitch (i.e., the characteristic distance) between two nearest features can be suitably chosen, such as to minimize propagation losses. Typically, the pitch is chosen substantially smaller than the desired resonance wavelength. In practice, a target resonance wavelength $\lambda_m$ of electromagnetic waves is first identified, then the number and dimensions of peripheral features can be deduced and then the circumference of the structure is optimized, taking due account of the non-fractional number of optical field nodes/antinodes in the structure at to the chosen resonance wavelength. Thus, in contrast to conventional and slotted rings, sidewall roughness is not the limiting factor here.

In the following, peripheral features are assumed to be provided in the form of radial teeth, consistently with FIGS. 4-9. The outermost extremities of the teeth draw the outside envelope $\mathcal{C}_o$. For simplicity, let consider the example of FIG. 5, where the resonator has a circular structure. As can be seen, the depicted resonator is characterized, in analogy with gear nomenclature, by:

A convex hull (outside circle $\mathcal{C}_o$ of radius $r_o$);
An inside circle $\mathcal{C}_i$ (of radius $r_i$);
A root circle $\mathcal{C}_r$ (radius $r_r$), joining the root of the teeth; and
A pitch circle $\mathcal{C}_p$ (having radius $r_p$), joining the pitch points of the teeth, taken e.g., as the centers of mass of the teeth;

Note that dimensions are voluntarily exaggerated, for the sake of illustration, here as in other figures. As seen, said teeth are characterized by:

The number N (typically large, e.g., N≥32) of teeth;
The depth h, i.e., the distance from the top of a tooth to the root;
The characteristic thickness $t_c$;
The closest (inner) distance δ between two nearest teeth; and
The characteristic pitch, i.e., the characteristic distance between nearest teeth at the level of the pitch circle $\mathcal{C}_p$.

Provided that N is sufficiently large, a characteristic pitch is given by the chordal pitch $p_c$, almost equal to the curvilinear pitch p, i.e., $p_c \approx p = r_p \Delta\theta = 2\pi r_p/N$, where $r_p$ is the pitch radius. When the teeth are wedged, the inner distance δ between nearest teeth typically varies from $\delta(r_r)=0$ to $\delta(r_o) \approx r_o \Delta\theta = 2\pi r_o/N$. In variants, δ is constant (rectangular or square teeth). Interestingly, the effective index decreases in the depth region (h) even when highly symmetrical features such as rectangular or square teeth are used. More generally, the teeth can be shaped as triangles, rectangles, half-ellipses, exponential tapers, etc.

Next, as the dimensions of the present resonator simply scale with the resonance wavelength, various kinds of electromagnetic waves can be contemplated. Yet, for the sake of illustration, the following description merely focuses on the optical applications.

Now, even within optical applications, various ranges of electromagnetic waves can be contemplated, typically 400-3000 nm. This wavelength range and all subsequently referred wavelengths λ are given as vacuum wavelengths, i.e. λ=c/ν where c is the speed of light and ν the light frequency. For applications to optical data communications, the following ranges are appropriate: 630-860 nm or 1300-1600 nm. Other ranges within 400-3000 nm are typically well suited for sensing applications.

At present, one may assume that a specific resonator is desired for a given (narrow) range of electromagnetic waves, i.e., characterized by typical wavelength $\lambda_m$. Said typical wavelength $\lambda_m$ is determined by the various dimensions involved in the resonator. The characteristic pitch $p_c$ between nearest peripheral features 12 shall then typically be substantially smaller than $\lambda_m$, for reasons stated earlier. Preferably, one has $p_c < \lambda_m/2$, which already ensures lowered losses. Better results are yet be achieved when $p_c < \lambda_m/4$. Typically, for wavelengths of interest in optical applications, $p_c$ is between 30-500 nm, and often between 30-200 nm.

Furthermore, the characteristic depth h of the teeth can vary substantially, just as the differences $r_o - r_i$, $r_o - r_r$ or $r_r - r_i$, as illustrated in FIGS. 8A-8D. Preferably yet, better results are achieved in practice for $r_o-r_i<10\lambda_m$ or $h<10\lambda_m$. In that respect, the features may not overlap, as depicted in FIG. 8C. In other words, $r_r$ can be equal to $r_i$, with $\delta(r_r=r_i)\neq 0$.

Satisfactory results are typically achieved when the (largest) radius $r_o$ of the envelope $\mathscr{E}_o$ is substantially larger than $\lambda_m$, preferably larger than $3\lambda_m/2$. Improved results will be obtained with $r_o$ larger than $2\lambda_m$. Since $p_c$ is preferably less than $\lambda_m/2$ and more preferably less than $\lambda_m/4$, results are gradually improved by providing $p_c$ less than $r_o/3$, $r_o/4$, $r_o/6$ and $r_o/8$.

For completeness, convenient transverse thicknesses (z-axis) are typically 50-400 nm, just like for known resonators. Typically, the body and the features are made of Silicon, grown on top of a 1 micrometer $SiO_2$ substrate layer. Fabricating such a device can for instance make use of the known silicon-on-insulator (or SOD technique. Manufacturing the radial features can be achieved using processes as known per se. The definition of the features can for instance be done by standard lithographical methods (e.g. electron beam lithography or optical lithography), followed by transferring this definition into the SOI substrate by reactive ion etching.

More generally, the material used for the body has a refractive index higher than a surrounding media's, thereby allowing for wave propagation. Suitable materials for the body comprise elements or compounds chosen amongst:

Semiconductors such as Si, GaAs, GaN, InP or InGaN;
oxides such as $SiO_2$, $TiO_2$, $Ta_2O_5$, $HfO_2$, $Al_2O_3$, or $LiNbO_3$; or
Nitrides such as $Si_3N_4$, SiON or TiON.

Mixtures can be contemplated, in applications.

Additional material surrounding said material can furthermore be provided as part of the device such as to form a surrounding medium with lower refractive index. The additional material typically comprising compounds chosen amongst:

Oxides such as $SiO_2$, $TiO_2$, $Ta_2O_5$, $HfO_2$, $Al_2O_3$, or $LiNbO_3$;
Nitrides such as $Si_3N_4$, SiON or TiON;
Polymers;
Oils; or
Water Incidentally, the thermo-optic coefficient of said additional material could have a sign apposite to that of the thermo-optic coefficient of the primary material of the body. It is accordingly possible to cancel the thermal drift of the resonance wavelength, which is advantageous for many applications.

Also, as seen in FIGS. 3-9, the resonator body typically has a disk or ring shape. Although generally circular shapes are preferred, the body can have an elliptical or convex shape. Disk-shapes can be advantageous for some applications (laser, modulators, etc.) because of constraints on electrode placement. Preferably, the body and the peripheral features are single-piece, owing to the fabrication process.

Ideally, the structure has a high quality factor (or Q). Following the above indications, quality factors Q>100000 can be achieved with rings having radii less than 5 micrometer. Pitch and other dimensions of the teeth can furthermore be optimized numerically (using e.g., finite-difference time-domain or FDTD simulations) for highest Q, highest optical fields or highest optical gradients, depending on the application.

In addition, in embodiments, devices as described above can be supplemented with a slot 40 (FIG. 7), as in known devices (FIGS. 2A-2.B). Said slot is preferably provided perpendicular to the plane (x, y). This way, the electric field could be advantageously enhanced for some applications (however, at the cost of increased losses).

Next, for evaluation of the above devices, finite difference time domain (FDTD) simulations have been performed with an in-house numerical tool that solves Maxwell's equations ab initio, in the time domain. The simulations results can accordingly be regarded as the actual wave propagation.

Figure 9:
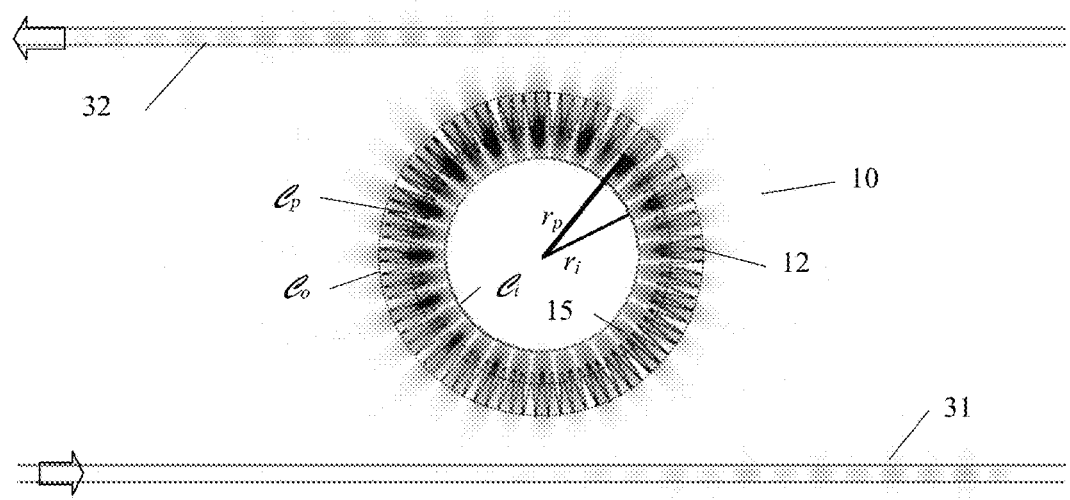
FIG. 9 shows some results obtained by simulating wave propagation in a device according to embodiments.
Figure 10:
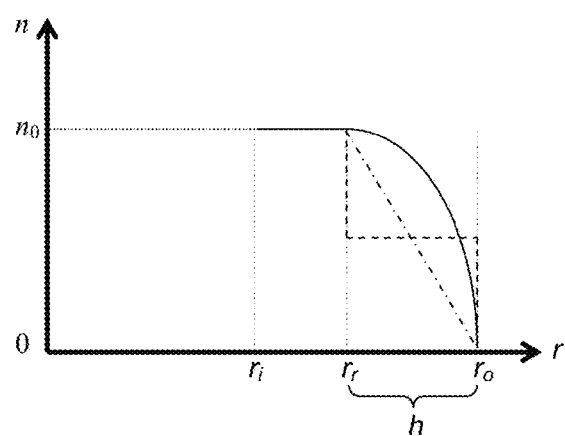
FIG. 10 is a graphics illustrating typical profiles of effective refractive indices within portions of resonators as obtained in embodiments.

For instance, a ring resonator can be simulated, which is excited with a light pulse through a waveguide being at or close to the resonance frequency of the ring, as depicted in FIG. 9. Wave propagation simulations have also been carried out for the ring resonator of FIG. 1 (prior art).

The excitation wavelength $\lambda_m$ used was 1550 nm. The pitch radius $r_p$ retained for the device of FIG. 9 was $r_p=1.7\lambda_m$, which radius corresponds to the mean radius of the device of FIG. 1 The simulated resonators in FIG. 1 and FIG. 9 have approximately the same effective radius and are using the same high-index material. In addition, the total depth h of the teeth (in this case corresponding to $r_o-r_i$, notwithstanding the visual rendering of the wedged body in FIG. 9) in the device of FIG. 9 is about $0.5\lambda_m$, the device designed with 80 radial teeth, protruding outwardly. Finally, in the simulation of FIG. 9, light is propagated from the source at the bottom-left input port of waveguide 31 to the top-left drop port of the upper waveguide 32. The wave transmission proceeds through the wedged ring and then to the upper-left drop port. The distance between one of the waveguides and the center of the resonator is 1800 nm. The remaining parameters are identical.

Each of FIGS. 1 and 9 shows a plot of the corresponding in-plane electric field $|E_{xy}|$, opposite values of the field indistinctly rendered, due to the gray-level used for the drawings. For the simulation results of FIG. 1 (prior art device), a small evanescent field is obtained, which is unable to provide a satisfactory enough coupling to surrounding cladding material. On the contrary, in the simulation of FIG. 9, a larger evanescent field is obtained. The latter enables efficient coupling to surrounding material, with advantageous applications such as outlined in introduction. FIG. 9 for instance clearly shows the occurrence of light propagation from the input port to the drop port.

The simulated structure gives furthermore access to intensity maxima of the field for the surrounding material, enabling stronger light-matter interactions and light-induced forces originating from the light field. It further relieves nanometer accuracy for tuning the coupling to critical coupling and works for both polarizations (TE+TM).

Incidentally and as mentioned earlier, a resonator structure as described herein enables a thermal ring resonators with suitable cladding (the latter having a sign of thermo-optic coefficient opposite to that of the body material), even for both polarizations. No shift of the resonance wavelength is observed with temperature.

Finally, resonators as described above can be considered as a fundamental building block for integrated optics in general and silicon photonics in particular. The invention accordingly encompasses an integrated optics device or apparatus built from several resonators such as described herein. Thus, the invention advantageously apply to applications such as chip-to-chip optical interconnects, wherein high physical integration density is needed.

While the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiment disclosed, but that the present invention will include all embodiments falling within the scope of the appended claims. For instance, other materials than those evoked above could be used. Also, teeth or wedges as involved in embodiments need not be strictly perpendicular to a wave propagation direction. Instead, wedges can be tilted, yielding essentially similar results, despite larger losses.

The invention claimed is:

1. An electromagnetic wave resonator (10), comprising a body (15), wherein the body: has a disk shape or a closed loop ring shape structure extending essentially in a plane (r, θ), comprises a material in a region between limit radii $r_i$ and $r_o$, where $0 \leq r_i < r_o$ and $r_o$ corresponds to a radius of a convex hull ($c_o$) of the structure; and configured for propagating electromagnetic waves, and wherein, an effective refractive index $n_e(r)$, as obtained from angularly averaging a refractive index of the material in the plane (r, θ), decreases within said region, and wherein the body is structured with triangular-shaped peripheral structures configured such as to obtain said decreasing effective refractive index $n_e(r)$, said triangular-shaped peripheral structures extending radially and outwardly, perpendicular to a closed-curve ($c_p$, $c_r$) characteristic of the structure, and the body and the triangular-shaped peripheral structures are of single-piece construction, wherein the resonator is configured for a range of electromagnetic wavelengths between 630 nm to 860 nm or 1300 nm to 1600 nm; and a chordal pitch ($p_c$) between said triangular-shaped peripheral structures is less than $\lambda_m/2$ where $\lambda_m$ is a wavelength of an electromagnetic excitation wave, and wherein a characteristic depth of a triangular-shaped peripheral structure (h)<$10\lambda_m$ and $r_r=r_i$ where $r_i$ is a limit radius corresponding to a defined inside closed-curve $c_i$ and $r_r$ is a radius of a root closed-curve $c_r$ defining a joining of a root of each triangular-shaped peripheral structure, and $\delta(r_r=r_i) \neq 0$ where $\delta(r)$ is a closest inner distance between two nearest triangular-shaped peripheral structures.

2. The resonator of claim 1, wherein an effective density of the material, as obtained from angularly averaging a density (ρ) of the material in the plane (r, θ), decreases in said region.

3. The resonator of claim 2, wherein an effective fill factor of the material, as obtained from angularly averaging a fill factor of the material in the plane (r, θ), decreases in said region.

4. The resonator of claim 1, wherein:
the chordal pitch, between said triangular-shaped peripheral structures is less than $\lambda_m/4$.

5. The resonator of claim 4, wherein said characteristic pitch ($p_c$) is between 30 nm to 500 nm, preferably between 30 nm to 200 nm.

6. The resonator of claim 4, wherein the radius $r_o$ of the convex hull ($c_o$) is substantially larger than $\lambda_m$, preferably larger than $3\lambda_m/2$ and more preferably larger than $2\lambda_m$.

7. The resonator of claim 1, wherein the body has a slot, preferably perpendicular to said plane.

8. The resonator of claim 1, wherein the body comprises a material with a refractive index higher than a surrounding media's, wherein the material comprises elements or compounds chosen amongst:
semiconductors such as Si, GaAs, GaN, InP or InGaN;
oxides such as $SiO_2$, $TiO_2$, $Ta_2O_5$, $HfO_2$, $Al_2O_3$, or $LiNbO_3$; or
nitrides such as $Si_3N_4$, SiON or TiON.

9. The resonator of claim 8, further comprising an additional material surrounding said material such as to form said surrounding media and preferably comprising compounds chosen amongst:
oxides such as $SiO_2$, $TiO_2$, $Ta_2O_5$, $HfO_2$, $Al_2O_3$, or $LiNbO_3$;
nitrides such as $Si_3N_4$, SiON or TiON;
polymers;
oils; or water.

10. The resonator of claim 8, further comprising an additional material surrounding said material such as to form said surrounding media, wherein a thermo-optic coefficient of said additional material and a thermo-optic coefficient of said material have opposite signs.

11. An integrated optics device comprising one or more resonators of claim 1.

12. The resonator of claim 1, wherein the effective refractive index $n_e(r)$ decreases in a stepwise manner.

13. The resonator of claim 1, wherein the effective refractive index $n_e(r)$ decreases continuously with a degree of curvature.

* * * * *